United States Patent [19]

Colling

[11] Patent Number: 5,380,980

[45] Date of Patent: Jan. 10, 1995

[54] ADJUSTABLE SLIP-FIT WELDING NOZZLE

[75] Inventor: Ronald W. Colling, Appleton, Wis.

[73] Assignee: Miller Electric Manufacturing Co., Appleton, Wis.

[21] Appl. No.: 140,439

[22] Filed: Oct. 25, 1993

[51] Int. Cl.$^6$ ............................................. B23K 9/173
[52] U.S. Cl. ............................................. 219/137.31
[58] Field of Search .............. 219/136, 137.31, 137.42, 219/137.44

[56] References Cited

U.S. PATENT DOCUMENTS

3,488,468  1/1970  Carbone .............................. 219/136
4,672,163  6/1987  Matsui et al. ........................ 219/136

*Primary Examiner*—Clifford C. Shaw
*Attorney, Agent, or Firm*—Donald Cayen

[57] ABSTRACT

An adjustable slip-fit welding nozzle enables very fine adjustments to be made to the dimensional relationship between a nozzle orifice and a welding contact tip of a wire welding gun. The welding contact tip is screwed into a tubular adapter that is stationarily joined to the welding gun. The adapter has a stop that extends radially therefrom. The nozzle is part of an extension assembly that is rotatable on the adapter. The extension assembly includes an insert with an end that is at an oblique angle to the adapter longitudinal axis. By rotating the extension assembly on the adapter while holding the insert angled end against the stop, the extension assembly and thus the nozzle orifice reciprocate relative to the welding contact tip. The extension assembly is rotated on the adapter until the nozzle orifice is at a desired dimensional relationship with the welding contact tip. The extension assembly is comprised of a tubular sleeve, insulator, and insert. The three components are assembled together into a unitary extension assembly by radially swaging the sleeve to the insulator and the insulator to the insert.

24 Claims, 3 Drawing Sheets

ADJUSTABLE SLIP-FIT WELDING NOZZLE

BACKGROUND OF THE INVENTION

1. Field of the Invention

This invention pertains to arc welding, and more particularly to adjustable nozzle arc welding guns.

2. Description of the Prior Art

A vital component of every wire welding system is the welding gun. In addition to supplying welding wire and electrical power to a workpiece, the gun also directs a stream of inert gas that shields the welding arc. Consequently, wire welding guns are required to accommodate an interplay of mechanical, electrical, and fluid systems.

The welding wire is fed through the welding gun body and through an elongated welding contact tip. The welding contact tip terminates approximately at the location of an orifice of a nozzle that directs the shielding gas to the region of the weld. The dimensional relationship between the end of the contact tip and the nozzle orifice is an important parameter of the welding process. It is desirable that the welding gun be designed to provide an adjustable dimension between the nozzle orifice and the tip so that the gun can be used with many different welding applications. It is also highly desirable that the dimensional relationship, once it is made, remain fixed for the duration of a welding job. At the same time, the adjustment must be convenient to change when needed to suit a different welding requirement.

In practice, the forgoing goals are difficult to achieve. A major factor that must be considered when designing a wire welding gun is that welders are prone to striking the gun against a hard surface to remove weld spatter buildup at the contact tip and the nozzle. To solve the adjustment problem, many prior wire welding guns are designed with nozzles that are fixed relative to the gun body and that use different length welding contact tips that are interchangeable with each other. The contact tips are invariably fastened by some mechanical means into the gun body. A tip of the desired length for the job at hand is secured into the body, and it is replaced with a different length tip when required for a different job. The fixed-nozzle multi-tip solution has disadvantages. One disadvantage is that an inventory of different length tips must be kept on hand, which is undesirably expensive. Another disadvantage is that for many jobs the available tip lengths may only approximate the desired length. Unless a supply of tips having very small length increments is stocked, the welder must often be satisfied with a tip of other than optimum length.

Another prior solution to the tip-orifice dimensional problem was to employ a single length tip but an adjustable nozzle. Nozzle adjustment was usually achieved by means of mating threads on the nozzle and another part of the gun body. By rotating the nozzle, its axial position relative to the contact tip was changed. Although the adjustable nozzle-fixed tip design could provide a correct dimensional relationship between the tip and the nozzle orifice, it was very difficult to maintain. The threads were easily damaged, and the parts were prone to seizing together from dirt and other foreign matter. In addition, the threaded nozzle design was undesirably expensive.

Another unsatisfactory prior attempt to provide adjustability between the nozzle and welding contact tip was a slide-on nozzle that fit by friction over a portion of the gun body. The slide-on nozzle was slidable relative to the contact tip to provide very fine adjustments. However, the slide-on nozzle had no positive stops to maintain an initial desired location of the nozzle relative to the contact tip. As a result, the nozzle was prone to slide out of position during the course of normal welding operations.

Thus, a need exists for a wire welding gun with improved capabilities for tip-nozzle adjustment.

SUMMARY OF THE INVENTION

In accordance with the present invention, an adjustable slip-fit welding nozzle is provided that is infinitely adjustable relative to the welding contact tip and that maintains its adjusted position during welding operations. This is accomplished by apparatus that includes an extension assembly that rotates on an adapter and has an angled surface that bears against a stop on the mandrel.

The extension assembly is comprised of three tubular components: a sleeve, an insert, and an insulator interposed between the sleeve and insert. It is a feature of the invention that the sleeve, insulator, and insert are assembled concentric to each other without press fits or fasteners. For that purpose, the outer diameters of the insert and of the sleeve are fabricated with one or more circumferential grooves. The grooves of the sleeve and the insert are in transverse alignment when the insert is at its proper location inside the sleeve. The three components are swaged together by applying opposed transverse forces at least part way around the circumference of the sleeve groove. That action deforms the wall of the sleeve groove inwardly to create opposed lobes on the inner diameter of the sleeve. In turn, the outer diameter of the insulator under the sleeve lobes deforms to create depressions that receive the sleeve lobes. The inner diameter of the insulator wall under the depressions in the outer diameter thereof also deform inwardly to create lobes. Those lobes on the insulator inner diameter enter the groove in the insert. The result is that the three components are rigidly and reliably assembled together to produce the extension assembly.

A nozzle is attached to the front end of the sleeve. The surface of the back edge of the insert lies in a plane that is at an angle to the longitudinal axis of the extension assembly.

The adapter is threaded into the welding gun body. A central passage enables a welding wire and shielding gas to pass through the adapter from the gun body. The welding contact tip is screwed into the adapter front end; the welding wire passes through a hole in the welding contact tip. The adapter is designed to fit within the extension assembly with a small amount of clearance between the adapter outer diameter and the insert inner diameter. The adapter includes spring rings or other elements that cooperate with the insert inner diameter to provide a firm friction fit between the adapter and the extension assembly. Cross holes near the adapter front end enable the shielding gas to flow from the adapter center passage into the interior of the extension assembly and out the nozzle orifice.

Secured to the adapter near its back end is a radially extending stop. The stop is located axially on the adapter such that the stop abuts the angled back end of the insert of the extension assembly when the nozzle orifice is at approximately its proper axial location relative to the welding contact tip.

The adjustable slip-fit welding nozzle is operated by rotating the extension assembly on the adapter and simultaneously urging the insert angled back end against the adapter stop. That action causes the extension assembly to slide axially along the adapter; rotation of more than 180 degrees of the extension assembly produces corresponding reciprocation of the extension assembly along the adapter. As a consequence, the dimensional relationship between the welding contact tip and the nozzle orifice changes. The extension assembly is rotated to an angular position that gives the desired dimensional relationship between the end of the contact tip and the nozzle orifice.

After the correct dimensional relationship has been established between the nozzle orifice and the welding contact tip, a welder need not be concerned that the relationship will change during use. That is because the tight frictional fit between the insert and the adapter assures that the extension assembly will not rotate due to normal movements of the welding gun. Further, the welder can strike the nozzle or tip against a hard surface without affecting the dimensional relationship of the tip and nozzle, because the angle of the insert back end is designed to prevent backdriving rotation of the extension assembly by the adapter stop due to any linear force applied to the nozzle.

The method and apparatus of the invention, using a cam type adjustment between an extension assembly and an adapter stop, thus enable the proper dimensional relationship between a welding contact tip and a nozzle orifice to be set quickly and easily. The prior practice of stocking different length contact tips to obtain the proper dimensional relationship between the tip and the nozzle orifice is eliminated.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
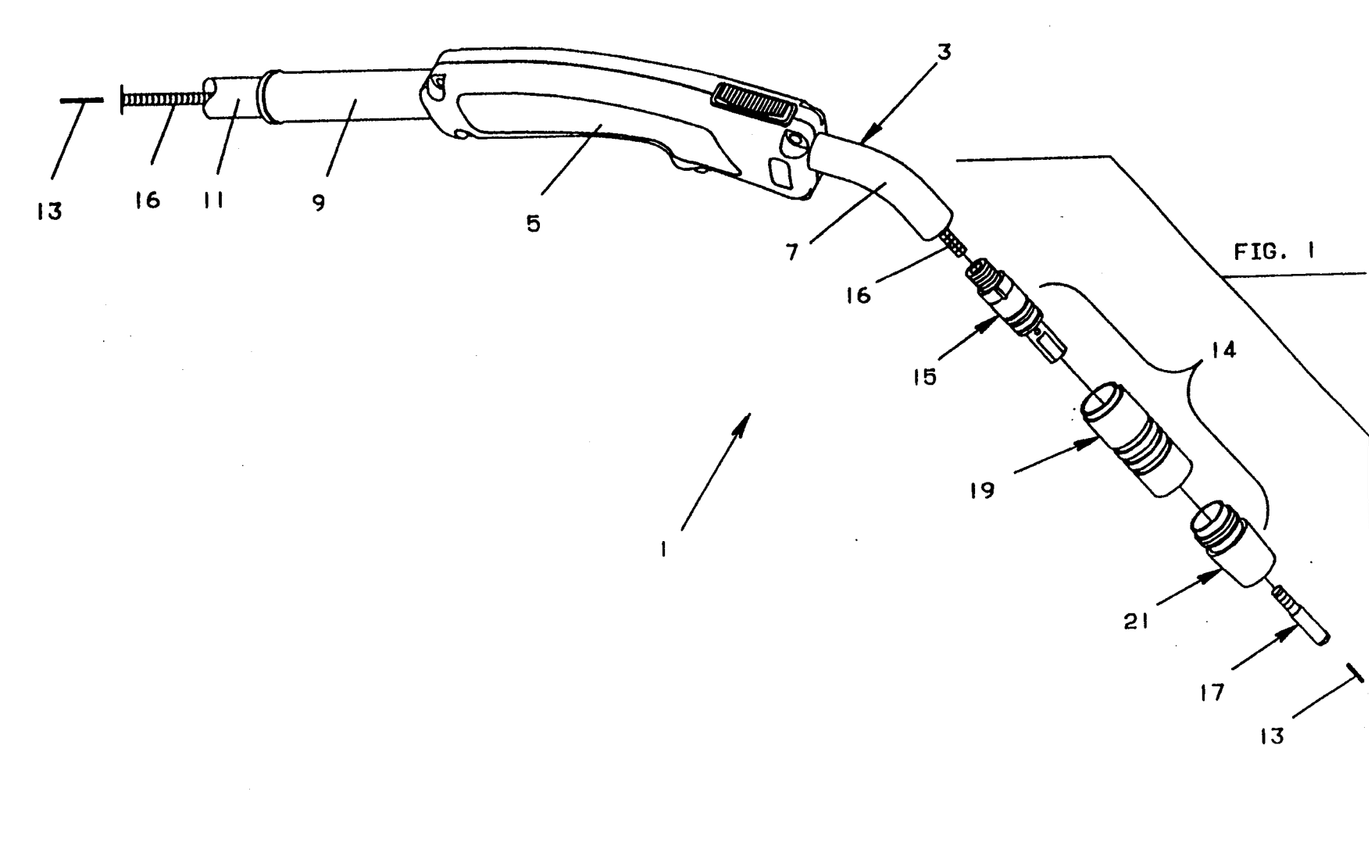
FIG. 1 is an exploded perspective view of a typical welding gun that advantageously includes the adjustable slip-fit welding nozzle of the present invention.

Referring to FIG. 1, a wire welding gun 1 is illustrated that includes the present invention. The wire welding gun 1 is comprised of a body 3 that includes a handle 5. The particular body 3 and handle 5 shown are merely representative of a wide variety of shapes and sizes that can be used for those components.

The body 3 of the wire welding gun 1 further includes a head tube 7 and a strain relief 9. The strain relief 9 accepts passage of a composite hose, typically represented at reference numeral 11, to a source of inert gas and electrical connections, not shown. A spring coil liner 16 is inside the hose 11. A welding wire 13 passes through the spring coil liner 16, strain relief 9, handle 5, and head tube 7.

In accordance with the present invention, an adjustable slip-fit welding nozzle 14 is incorporated into the welding gun 1. The adjustable slip-fit welding nozzle 14 enables the dimensional relationship between a welding contact tip 17 and a nozzle 21 to be conveniently varied while positively maintaining a selected dimensional relationship during use of the welding gun.

In addition to the nozzle 21, the adjustable slip-fit welding nozzle 14 includes an adapter 15 and an extension assembly 19. Also, looking at FIG. 5–7, the adapter 15 is manufactured as a tubular component that defines a longitudinal axis 22 and that has a front end 23 and a back end 25. The adapter back end 25 is preferably threaded to screw into the head tube 7 of the gun body 3. A center section 26 extends between the threaded back end 25 and a tapered section 30 adjacent the front end 23. The center section 26 has an accurately dimensioned outer diameter 28 that may extend for the full length of the center section. Alternately, as shown, the center section may include a relatively short length 39 that has an outer diameter 41 that is slightly larger and less accurately controlled than the outer diameter 28. For example, the diameter 41 may be the diameter produced by extruding a blank of material from which the finished adapter is later machined to its final described configuration.

Figure 5:
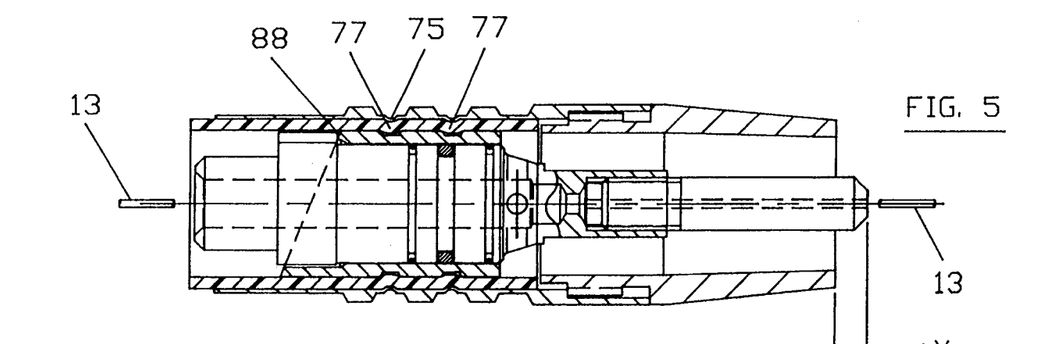
FIG. 5 is a cross sectional view on an enlarged scale of the adjustable slip-fit welding nozzle showing a first dimensional relationship between the nozzle orifice and the welding contact tip.
Figure 6:
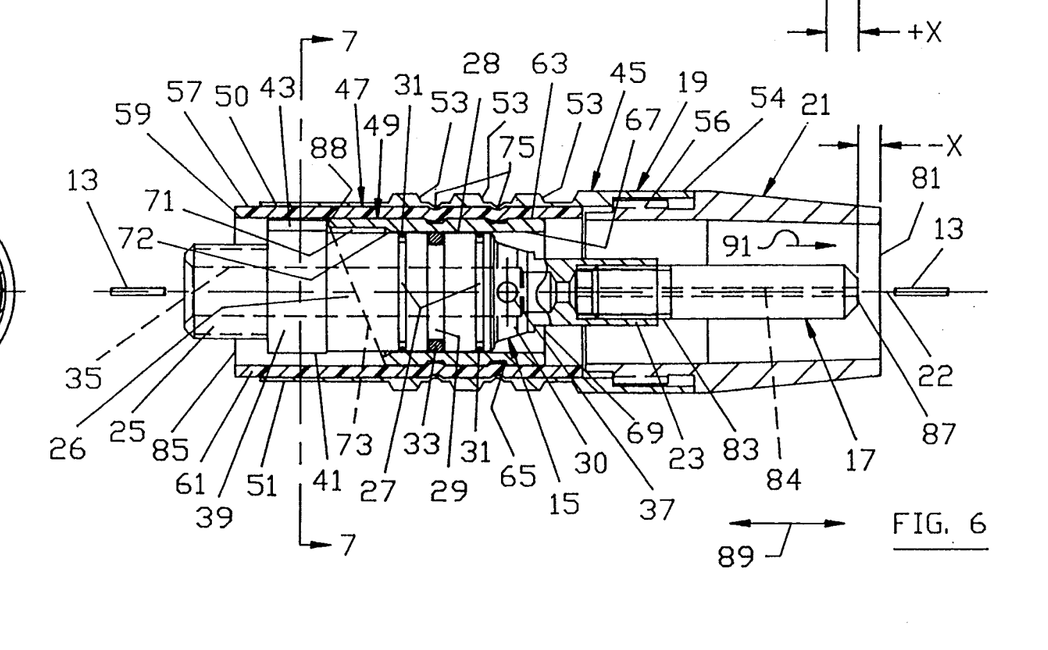
FIG. 6 is a cross sectional view of the adjustable slip-fit welding nozzle showing a second dimensional relationship between the nozzle orifice and the welding contact tip.
Figure 7:
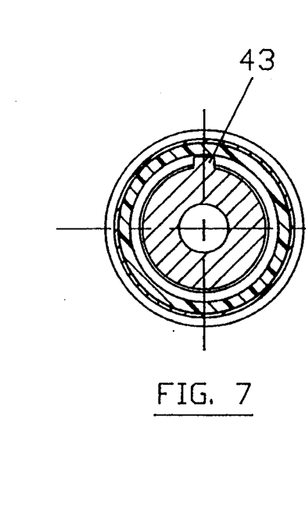
FIG. 7 is a cross sectional view taken along line 7—7 of FIG. 6.

In the outer diameter 28 of the adapter center section 26 are two rather narrow circumferential grooves 27 and a wider groove 29 between them. An expansion ring 31 is placed in each groove 27, and an O-ring 33 is placed in the groove 29. The adapter has an inner passage 35 extending therethrough. There are cross holes 37 extending through the section 30 to the passage 35. The adapter front end 23 is tapped to receive the contact welding tip 17. A stop 43 is formed on the outer diameter 41 of the adapter section 39. The stop 43 may also be in the form of a separate square key, pin, or other element secured to the adapter.

The extension assembly 19 is comprised of three tubular components: a sleeve 45, an insulator 47, and an insert 49. The sleeve 45 is preferably made of steel. It has an inner diameter 50 and an outer diameter 52. One or more circumferential grooves 53 are machined in the sleeve outer diameter 51. There is left a thin wall 55 of material between the roots of the grooves 53 and the sleeve inner diameter 50, FIGS. 2 and 3. The front end 54 of the sleeve has threads 56.

Figure 2:
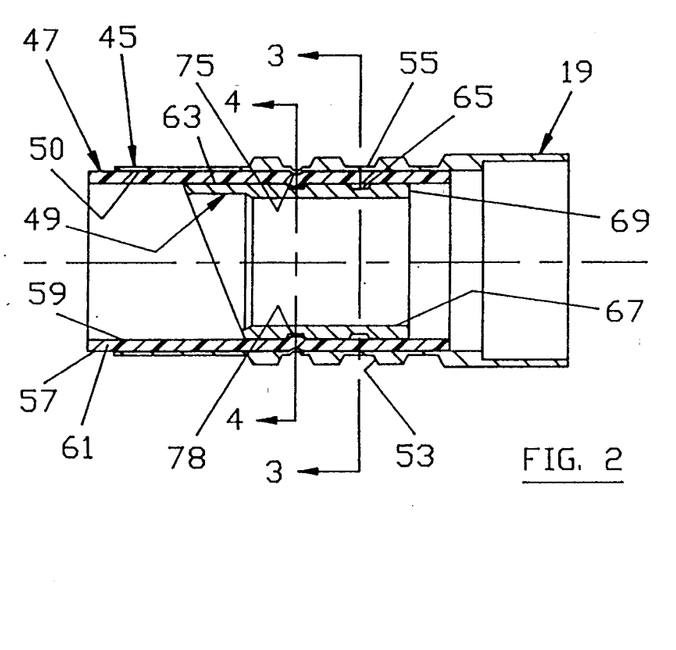
FIG. 2 is a longitudinal cross sectional view of the extension assembly of the present invention.
Figure 3:
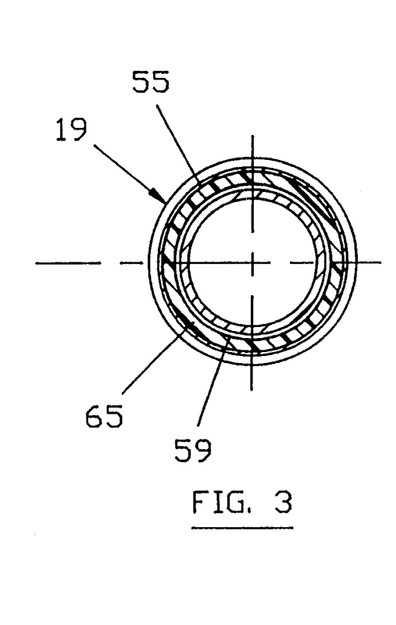
FIG. 3 is a cross sectional view taken along line 3—3 of FIG. 2.

The insulator 47 has an outer diameter 57 that is slightly smaller than the inner diameter 50 of the sleeve 45. The insulator has an inner diameter 59 and a wall 61. Acceptable materials for the insulator are a G-7 silicone/fiberglass material and a G-5 melamine/fiberglass material, as are known in the art.

The insert 49 is made of a half-hard brass material. The insert has an outer diameter 63 that is slightly smaller than the inner diameter 59 of the insulator 47. There are grooves 65 in the insert outer diameter 63 that have the same axial spacing between them as the axial spacing of the grooves 53 of the sleeve 45. The insert has a first inner diameter 67 at its front end 69 that is slightly larger than the outer diameter 28 of the adapter center section 26. The insert has a second inner diameter 71 at its back end 73 that is larger than the first inner diameter 67. There is a radiused chamfer 72 between the two inner diameters 71 and 67.

Figure 4:
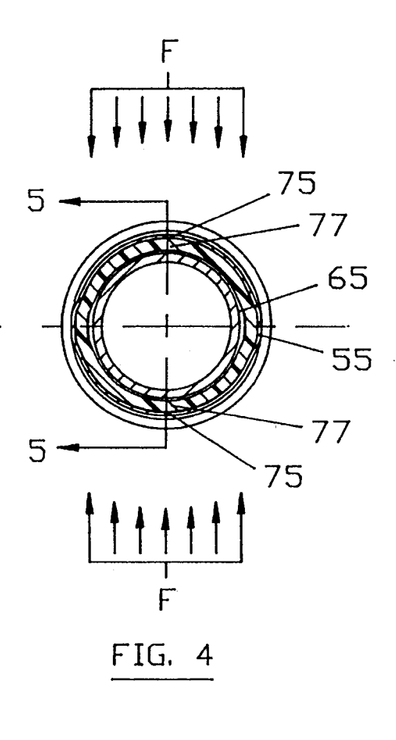
FIG. 4 is a cross sectional view taken along line 4—4 of FIG. 2.

It is a feature of the present invention that the sleeve 45, insulator 47, and insert 49 are assembled together to produce the unitary extension assembly 19 without requiring either fasteners or press fits between any of the components. Assembly of the extension assembly is achieved by sliding the insulator to a desired location inside the sleeve. The insert is slid inside the insulator such that the insert grooves 65 are radially aligned with corresponding sleeves grooves 53. Then opposite forces F are applied part way around the circumferences of the sleeve grooves. See FIG. 4. The forces F cause the thin walls 55 at the bottom of the sleeve grooves 53 to deform inwardly and create partially circumferential lobes 75. The inward deformation of the sleeve walls 55 at the lobes 75 produces similar deformation forces on the insulator wall 61 around the portions 77 thereof inwardly of the sleeve lobes 75. As a result, the insulator outer diameter 57 deforms to form depressions that receive the corresponding sleeve lobes. Simultaneously, the insulator inner diameter 59 is deformed to create lobes 78. The lobes 78 enter the aligned grooves 65 of the insert. The result is that the sleeve, insulator, and insert become tightly assembled to each other to form the unitary extension assembly.

The back end of the nozzle 21 is screwed to the threads 56 of the sleeve 45 of the extension assembly 19. The nozzle 21 has an orifice 81 at the front end thereof.

The welding contact tip 17 has threads 83 on its back end that mate with similar threads in the front end 23 of the adapter 15. The welding contact tip has an interior hole 84 for its entire length. The tip hole 84 communicates with the adapter passage 35. The welding wire 13 passes through the adapter passage 35 and the welding contact tip hole 84 and out the tip front end 87.

The extension assembly 19 with the nozzle 21 fits over the adapter 15. The extension assembly back end 85 is slipped over the adapter front end 23 and is pushed onto the adapter outer diameter 28. The chamfer 72 of the insert 49 protects the O-ring 33. The inner diameter 67 of the insert 49, the depth of the adapter grooves 27, and the diameter of the spring rings 31 are carefully chosen so that the extension assembly has a snug friction fit on the adapter. The extension assembly is pushed onto the adapter 15 until the back end 73 of the insert 49 contacts the front surface 88 of the adapter stop 43. At that point, the extension assembly is frictionally retained on the adapter and forms a vital part of the welding gun 1.

The adjustable slip-fit welding nozzle 14 enables the dimensional relationship between the orifice 81 of the nozzle 21 and the end 87 of the welding contact tip 17 to be easily adjusted in infinitely small increments. Adjustment is achieved by rotating the extension assembly 19 on the adapter 15 about the axis 22 while simultaneously pushing the extension assembly backwardly against the adapter stop 43, that is, to the left with respect FIGS. 5 and 6. Those combined actions cause the extension assembly and nozzle to reciprocate along the axis 22 in the directions of arrow 89 relative to the welding contact tip. Consequently, the distance between the nozzle orifice and the contact tip changes. FIG. 5 shows one end position of the extension assembly relative to the adapter that produces a maximum projection +X of the tip end from the nozzle orifice. FIG. 6 shows the opposite end position of the extension assembly in which the tip end is at a maximum recess −X relative to the nozzle orifice. The amount of adjustment is dependent upon the angle of the back end 73 of the insert 49 relative to the axis 22. Similarly, the nominal location of the nozzle orifice relative to the welding contact tip is determined by the distance of the stop surface 88 of the adapter stop 43 from the contact tip end 87, and by the distance between the insert back end 73 and the nozzle orifice. I have found that an angle of about 22 degrees for the plane of the insert back end relative to the axis 22 gives satisfactory results. Similarly, a maximum extension +X of approximately 0.15 inches and a maximum recess −X of approximately 0.10 inches for the tip end relative to the nozzle orifice works very well.

In operation, the back end 25 of the adapter 15 is threaded or otherwise joined to the gun head tube 7. The extension assembly 19 is installed over the adapter and the rings 31. The welding wire 13 is fed via the spring coil liner 16 through the gun 3 and through the adapter passage 35, then on through the hole 84 in the welding contact tip 17. The extension assembly and nozzle 21 are rotated about the axis 22 to give the proper dimensional relationship between the nozzle orifice 81 and the contact tip end 87 for the particular welding job to be performed. The shielding gas is set to flow through the gun 1, into the adapter passage 35, and out the adapter cross holes 37. From there, the shielding gas flows into the extension assembly front end 54, into the nozzle 21, and out the nozzle orifice as indicated by arrow 91. Welding can then begin. The welder can strike the welding contact tip or the nozzle against a hard surface without affecting the dimensional relationship between the nozzle orifice and the contact tip. That is because the stop 43 provides a positive stop for the extension assembly, so a linear blow on the nozzle will not move it relative to the tip. Similarly, an axial force on the nozzle will not rotationally backdrive the extension assembly. The result is a stable welding gun 1 that not only is easily adjustable to suit different welding jobs but also maintains its adjustment during welding operations.

In summary, the results and advantages of wire welding guns can now be more fully realized. The dimensional relationship of the welding contact tip 17 and the nozzle orifice 81 can be adjusted in infinitely small increments, and the desired relationship is maintainable during a welding job despite normal hard use by a welder. This desirable result comes from using the combined functions of the adapter stop 43 and the insert angled back end 73. Rotation of the extension assembly 19 on the adapter 15 while urging the insert back end against the adapter stop changes the dimensional relationship between the welding contact tip and the nozzle orifice. The extension assembly itself is manufactured and assembled in a novel way so as to incorporate insulative properties into an important structural member of the welding gun without requiring fasteners, bonding agents, or press fits.

It will also be recognized that in addition to the superior performance of the wire welding gun 1 with the adjustable slip-fit welding nozzle 14, its construction is such as to reduce the cost of its manufacture and operation to economical levels. Also, since the extension assembly 19, adapter 15, and related components are very sturdy and simple structures, the need for maintenance is substantially reduced.

Thus, it is apparent that there has been provided, in accordance with the invention, an adjustable slip-fit welding nozzle that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A welding gun comprising:
   a. a body;
   b. a generally tubular adapter defining a longitudinal axis and having a back end joined to the body, a front end, and a center section with a predetermined outer diameter between the front and back ends;
   c. a stop secured to the adapter center section;
   d. an elongated welding contact tip having a first end attached to the adapter front end and a second end;
   e. extension means for rotation on the adapter center section about the longitudinal axis through an angle of at least 180 degrees and for cooperating with the stop to continuously translate along the longitudinal axis in response to rotation of the extension means; and
   f. a nozzle attached to the extension means and defining an orifice that is located proximate the welding contact tip second end, the nozzle translating with the extension means to provide adjustment of the welding gun in preparation for and integral to the operation thereof by varying the dimensional relationship between the nozzle orifice and the welding contact tip second end in response to rotation of the extension means.

2. The welding gun of claim 1 wherein the stop is a key secured to the outer diameter of the adapter center section.

3. A welding gun comprising:
   a. a body;
   b. a generally tubular adapter defining a longitudinal axis and having a back end joined to the body, a front end, and a center section with a predetermined outer diameter between the front and back ends;
   c. a stop secured to the adapter center section;
   d. an elongated welding contact tip having a first end attached to the adapter front end and a second end;
   e. extension means for rotating on the adapter center section about the longitudinal axis and for cooperating with the stop to reciprocate along the longitudinal axis in response to rotation of the extension means, wherein the extension means comprises:
      i. a tubular sleeve having a wall with at least one annular groove in the outer diameter thereof, at least a portion of the sleeve wall at the groove defining an inwardly projecting lobe;
      ii. a tubular insulator inside and concentric with the sleeve and having a wall with an outer diameter that defines a depression that receives the sleeve lobe, the insulator wall having an inner diameter that defines at least one inwardly projecting lobe; and
      ii. a tubular insert inside and concentric with the insulator, the insert having a wall with a groove in the outer diameter thereof that is in radial alignment with the groove in the sleeve, the insert groove receiving the insulator lobe;
   f. a nozzle attached to the extension means and defining an orifice that is located proximate the welding contact tip second end, the nozzle reciprocating with the extension means to thereby vary the dimensional relationship between the nozzle orifice and the welding contact tip second end in response to the rotation of the extension means,
   so that sleeve, insulator, and insert are assembled into a unitary extension assembly.

4. The welding gun of claim 3 wherein:
   a. the insert has a back end that defines a plane that is oblique to the longitudinal axis; and
   b. the insert back end is in contact with the stop to thereby cause reciprocation of the extension assembly in response to rotation of the extension assembly on the adapter.

5. Apparatus for welding a workpiece comprising:
   a. a welding contact tip having first and second ends;
   b. adapter means for receiving the welding contact tip first end;
   c. extension means for rotating on the adapter means through an angle greater than 180 degrees about an axis of rotation and for reciprocating along the adapter means in response to rotation of more than 180 degrees of the extension means;
   d. a nozzle attached to the extension means for rotation and reciprocation therewith, the nozzle having an orifice located proximate the welding contact tip second end; and
   e. head tube means joined to the adapter means for manipulating the welding contact tip and the nozzle into welding relation with the workpiece,
   so that the dimensional relationship between the nozzle orifice and the welding contact tip second end can be varied by rotating the extension assembly on the adapter means.

6. Apparatus for welding a workpiece comprising:
   a. a welding contact tip having first and second ends;
   b. adapter means for receiving the welding contact tip first end;
   c. extension means for rotating on the adapter means about an axis of rotation and for reciprocating along the adapter means in response to rotation of more than 180 degrees of the extension means, wherein the extension means comprises:
      i. a tubular insert having an outer diameter with at least one annular groove therein;
      ii. a tubular insulator outside and concentric with the insert, the insulator having an inner diameter with at least one lobe that extends inside the groove of the insert to thereby assemble the insert and insulator together, the insulator having an outer diameter with at least one depression therein in radial alignment with the lobe in the insulator inner diameter; and
      iii. a tubular sleeve outside and concentric with the insulator, the sleeve having a wall with an inner diameter that has at least one lobe that extends inside the depression in the insulator outer diameter to thereby assemble the sleeve and insulator together;

d. a nozzle attached to the extension means for rotation and reciprocation therewith, the nozzle having an orifice located proximate the welding contact tip second end; and e. head tube means joined to the adapter means for manipulating the welding contact tip and the nozzle into welding relation with the workpiece, so that the dimensional relationship between the nozzle orifice and the welding contact tip second end can be varied by rotating the extension assembly on the adapter means.

7. Apparatus for welding a workpiece comprising:

a. a welding contact tip having first and second ends;

b. adapter means for receiving the welding contact tip first end;

c. extension means for rotating on the adapter means about an axis of rotation and for reciprocating along the adapter means in response to rotation of more than 180 degrees of the extension means;

d. a nozzle attached to the extension means for rotation and reciprocation therewith, the nozzle having an orifice located proximate the welding contact tip second end; and e. head tube means joined to the adapter means for manipulating the welding contact tip and the nozzle into welding relation with the workpiece, wherein the adapter means comprises:

i. a generally tubular adapter having a first end that receives the welding contact tip first end and a second end that is joined to the head tube means; and ii. stop means secured to the adapter for cooperating with the extension means to cause reciprocation of the nozzle in response to rotation of the extension means on the adapter, wherein the extension means comprises:

i. a tubular sleeve concentric with the axis of rotation;

ii. a tubular insert concentric with the axis of rotation and having a back end that is in contact with the stop means, the insert back end defining a plane that is oblique to the axis of rotation; and iii. a tubular insulator concentric with and interposed between the sleeve and the insert, the sleeve, the insulator, and insert being assembled together as a unitary assembly, so that the dimensional relationship between the nozzle orifice and the welding contact tip second end can be varied by rotating the extension assembly on the adapter means.

8. In a welding gun having a head tube, a nozzle with an orifice, a welding contact tip with a front end proximate the nozzle orifice, and an adapter that defines a longitudinal axis and that holds the welding contact tip stationary relative to the head tube, the improvement comprising:

a. a stop secured to the adapter; and b. extension means for cooperating with the stop to vary the dimensional relationship between the nozzle orifice and the welding contact tip front end, wherein the extension means comprises an extension assembly having a first end that is attached to the nozzle and a back end that is in contact with the stop, the extension assembly reciprocating along the adapter longitudinal axis in response to rotation of the extension assembly about the adapter longitudinal axis through an angle greater than 180 degrees to thereby vary the dimensional relationship between the nozzle orifice and the welding contact tip front end.

9. In a welding gun having a head tube, a nozzle with an orifice, a welding contact tip with a front end proximate the nozzle orifice, and an adapter that defines a longitudinal axis and that holds the welding contact tip stationary relative to the head tube, the improvement comprising:

a. a stop secured to the adapter; and b. extension means for cooperating with the stop to vary the dimensional relationship between the nozzle orifice and the welding contact tip front end, wherein the extension means comprises an extension assembly having a first end that is attached to the nozzle and a back end that is in contact with the stop, the extension assembly reciprocating along the adapter longitudinal axis in response to rotation of the extension assembly about the adapter longitudinal axis to thereby vary the dimensional relationship between the nozzle orifice and the welding contact tip front end, wherein the extension assembly comprises:

i. a sleeve having a front end attached to the nozzle;

ii. an insulator inside and assembled to the sleeve; and iii. an insert inside and assembled to the insulator, the insert having a back end that is in contact with the stop and that makes an oblique angle relative to the longitudinal axis, so that rotating the extension assembly about the longitudinal axis causes reciprocation of the extension assembly and the nozzle relative to the welding contact tip to thereby vary the dimensional relationship between the nozzle orifice and the welding contact tip second end.

10. The improvement claim 9 wherein:

a. the insulator has a wall with an inner diameter that is formed with at least one partially circumferential lobe thereon and an outer diameter that is formed with at least one partially circumferential depression therein;

b. the sleeve has a wall with an inner diameter that is formed with at least one lobe that is received in the depression of the insulator to assemble the insulator to the sleeve; and c. the insert has a wall with an outer diameter that defines an annular groove that receives the insulator lobe to assemble the insulator to the insert and thereby assembly the sleeve, insert, and insulator together into a unitary assembly.

11. The improvement of claim 10 wherein the lobe in the sleeve and the depression in the insulator are coplanar with the lobe in the insulator and the groove in the insert.

12. A method of adjusting a welding gun comprising the steps of:

a. providing a contact welding tip having a front end and defining a longitudinal axis;

b. holding the contact welding tip stationary to the gun;

c. locating the orifice of a nozzle proximate and at a first dimensional location relative to the welding contact tip front end;

d. rotating the nozzle about the welding contact tip longitudinal axis through an angle greater than 180 degrees and simultaneously reciprocating the nozzle along the longitudinal axis; and e. stopping rotation of the nozzle at a predetermined second dimensional location relative to the welding contact tip front end.

13. The method of claim 12 wherein:

a. the step of holding the welding contact tip stationary comprises the step of joining an adapter to a gun head tube and attaching the welding contact tip to the adapter; and b. the step of rotating the nozzle about the longitudinal axis comprises the steps of:
   i. securing a stop to the adapter;
   ii. attaching the nozzle to an extension assembly having a back end that is at an oblique angle to the longitudinal axis; and
   iii. rotating the extension assembly on the adapter while holding the extension assembly back end against the adapter stop and thereby reciprocating the extension assembly and nozzle along the adapter.

14. In combination with a welding gun having a welding contact tip with a free end,
an adjustable slip-fit welding nozzle comprising:

a. a tubular adapter having a front end, a back end, and a center section between the front and back ends defining a longitudinal axis, the adapter front end receiving the welding contact tip;

b. an extension assembly capable of continuous unidirectional rotation around and reciprocation along the adapter;

c. ring means for providing a friction fit between the adapter center section and the extension assembly;

d. a nozzle attached to the extension assembly and having an orifice located proximate the welding contact tip free end; and e. stop means secured to the adapter center section for cooperating with the extension assembly to cause continuous reciprocation of the extension assembly along the adapter in response to continuous unidirectional rotation of the extension assembly therearound, so that rotating the extension assembly on the adapter causes a variation of the dimensional relationship between the nozzle orifice and the welding contact tip free end.

15. The combination of claim 14 wherein rotating the extension assembly on the adapter through an angle of 180 degrees causes a variation of approximately 0.25 inches in the dimensional relationship between the nozzle orifice and the welding contact tip free end.

16. The combination of claim 14 wherein rotating the extension assembly to a first position on the adapter causes the welding contact tip free end to extend approximately 0.15 inches outside the nozzle orifice, and rotating the extension assembly to a second position on the adapter causes the welding contact tip free end to be retracted approximately 0.10 inches inside the nozzle orifice.

17. In combination with a welding gun having a welding contact tip with a free end,
an adjustable slip-fit welding nozzle comprising:

a. a tubular adapter having a front end, a back end, and a center section between the front and back ends defining a longitudinal axis, the adapter front end receiving the welding contact tip;

b. extension means for rotating around and reciprocating along the adapter;

c. ring means for providing a friction fit between the adapter center section and the extension means;

d. a nozzle attached to the extension means and having an orifice located proximate the welding contact tip free end; and e. stop means secured to the adapter center section for cooperating with the extension means to cause reciprocation of the extension means along the adapter in response to rotation of the extension means therearound, wherein the extension means comprises:
   i. a tubular sleeve secured to the nozzle and having an inner diameter that defines at least one sleeve lobe;
   ii. a tubular insulator concentric with and inside the sleeve, the insulator having an outer diameter with a depression therein that receives the sleeve lobe and an inner diameter that defines at least one insulator lobe; and
   iii. a tubular insert having a groove that receives the insulator lobe, the insert having an inner diameter that cooperates with the ring means to provide a friction fit of the insert to the adapter center section, so that rotating the extension means on the adapter causes a variation of the dimensional relationship between the nozzle orifice and the welding contact tip free end.

18. The combination of claim 17 wherein the insert has a back end that is in contact with the stop means, the insert back end defining a plane that is at an oblique angle to the adapter longitudinal axis.

19. The combination of claim 18 wherein the insert back end defines a plane that makes an angle of between approximately 20 degrees and 25 degrees with the adapter longitudinal axis.

20. An extension assembly useful in a wire welding gun comprising:

a. a tubular sleeve defining a longitudinal axis and having a wall with at least one circumferential groove in the outer diameter thereof, at least a portion of the sleeve wall at the groove defining an inwardly projecting lobe; and b. a tubular insulator inside and concentric with the sleeve and having a wall with an outer diameter that defines a depression that receives the sleeve lobe, the insulator wall having an inner diameter that defines at least one inwardly projecting insulator lobe; and c. a tubular insert inside and concentric with the insulator, the insert having a wall with a groove in the outer diameter thereof that is in radial alignment with the groove in the sleeve, the insert groove receiving the insulator lobe, so that sleeve, insulator, and insert are assembled into a unitary extension assembly.

21. The extension assembly of claim 20 wherein the insert has a back end that defines a plane that is oblique to the sleeve longitudinal axis.

22. A method of making an extension assembly comprising the steps of:

a. providing a tubular sleeve having a longitudinal axis;

b. placing a tubular insulator inside the sleeve;

c. placing tubular insert inside the insulator; and d. radially swaging the sleeve, insulator, and insert together.

23. The method of claim 22 wherein:
   a. the step of providing a sleeve comprises the step of providing a sleeve with at least one annular groove in the outer diameter thereof; and
   b. the step of placing an insert comprises the steps of:
      i. providing an insert with at least one annular groove in the outer diameter thereof; and
      ii. placing the insert groove in radial alignment with the sleeve groove.

24. A method of making an extension assembly comprising the steps of:
   a. providing a tubular sleeve having a longitudinal axis, wherein the step of providing a sleeve comprises the step of providing a sleeve with at least one annular groove in the outer diameter thereof;
   b. placing a tubular insulator inside the sleeve wherein the step of placing an insert comprises the steps of:
      i. providing an insert with at least one annular groove in the outer diameter thereof; and
      ii. placing the insert groove in radial alignment with the sleeve groove;
   c. placing tubular insert inside the insulator; and
   d. radially swaging the sleeve, insulator, and insert together, wherein the step of swaging the sleeve, insulator, and insert together comprises the steps of:
      i. applying opposite forces to the sleeve part way around the groove therein;
      ii. deforming the sleeve groove to create a depression therein and a partially circumferential lobe on the sleeve inner diameter under the depression;
      iii. deforming the insulator outer diameter with the sleeve lobe and creating a partially circumferential lobe in the insulator inner diameter; and
      iv. receiving the insulator lobe in the insert groove.

* * * * *